(12) United States Patent
Sheth et al.

(10) Patent No.: US 11,118,921 B2
(45) Date of Patent: *Sep. 14, 2021

(54) VEHICLE ROUTING GUIDANCE TO AN AUTHORITATIVE LOCATION FOR A POINT OF INTEREST

(71) Applicant: Uber Technologies, Inc., San Francisco, CA (US)

(72) Inventors: Chandan Prakash Sheth, Fremont, CA (US); Sheng Yang, Fremont, CA (US); Vasudev Parameswaran, Fremont, CA (US); Shivendra Pratap Singh, Redwood City, CA (US); Jane Alam Jan, Santa Clara, CA (US)

(73) Assignee: Uber Technologies, Inc., San Francisco, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/601,510

(22) Filed: Oct. 14, 2019

(65) Prior Publication Data

US 2020/0041298 A1   Feb. 6, 2020

Related U.S. Application Data

(63) Continuation of application No. 15/606,555, filed on May 26, 2017, now Pat. No. 10,480,954.

(51) Int. Cl.
*G01C 21/34* (2006.01)
*G01C 21/36* (2006.01)
(Continued)

(52) U.S. Cl.
CPC ..... *G01C 21/3476* (2013.01); *G01C 21/3679* (2013.01); *G06F 7/023* (2013.01);
(Continued)

(58) Field of Classification Search
CPC ... G01C 21/3476; G01C 21/3679; G06F 7/20; G06F 7/023; G06F 7/14; G06N 5/003; G06N 20/20; G06N 20/00
See application file for complete search history.

(56) References Cited

U.S. PATENT DOCUMENTS

| 10,480,954 B2* | 11/2019 | Sheth et al. | G01C 21/3476 |
| 2003/0036848 A1* | 2/2003 | Sheha | G01C 21/3679 |
| | | | 701/468 |

(Continued)

OTHER PUBLICATIONS

United States First Action interview Office Action, U.S. Appl. No. 15/606,555, dated Apr. 24, 2019, four pages.

*Primary Examiner* — Dale W Hilgendorf
(74) *Attorney, Agent, or Firm* — Fenwick & West LLP

(57) ABSTRACT

An authoritative candidate is selected for determining a location of a point of interest (POI). Source data including name, address, and location for POIs is received from multiple data sources. The received data is normalized for ease of comparison, and coordinates for each candidate are compared to coordinates of other candidates to determine which candidate if any is an authoritative location for the POI. The candidate locations are compared using two models a metric-based scoring system and a machine learning model that may utilize a gradient boosted decision tree. The authoritative candidate can be used to render digital maps that include the POI. In addition, the authoritative candidate's location can be used to provide vehicle route guidance to the POI.

17 Claims, 13 Drawing Sheets

(51) Int. Cl.
  *G06F 7/20*      (2006.01)
  *G06F 7/02*      (2006.01)
  *G06F 7/14*      (2006.01)
  *G06N 20/00*     (2019.01)
  *G06N 5/00*      (2006.01)
  *G06N 20/20*     (2019.01)

(52) U.S. Cl.
  CPC ............... *G06F 7/14* (2013.01); *G06F 7/20* (2013.01); *G06N 5/003* (2013.01); *G06N 20/00* (2019.01); *G06N 20/20* (2019.01)

(56) References Cited

U.S. PATENT DOCUMENTS

| | | | |
|---|---|---|---|
| 2014/0258310 A1* | 9/2014 | Wong et al. | G01C 21/3679 707/749 |
| 2016/0069699 A1* | 3/2016 | Chen | G01C 21/3682 701/426 |
| 2016/0203198 A1* | 7/2016 | Roytblat | G06F 16/444 707/756 |
| 2018/0014161 A1* | 1/2018 | Warren | H04W 4/023 |
| 2018/0188052 A1* | 7/2018 | Singh | G01C 21/3476 |
| 2018/0306600 A1* | 10/2018 | Nicolaas | G01C 21/3691 |
| 2020/0209013 A1* | 7/2020 | Kornev | G06N 20/00 |
| 2020/0363225 A1* | 11/2020 | Lear | G06F 16/29 |

\* cited by examiner

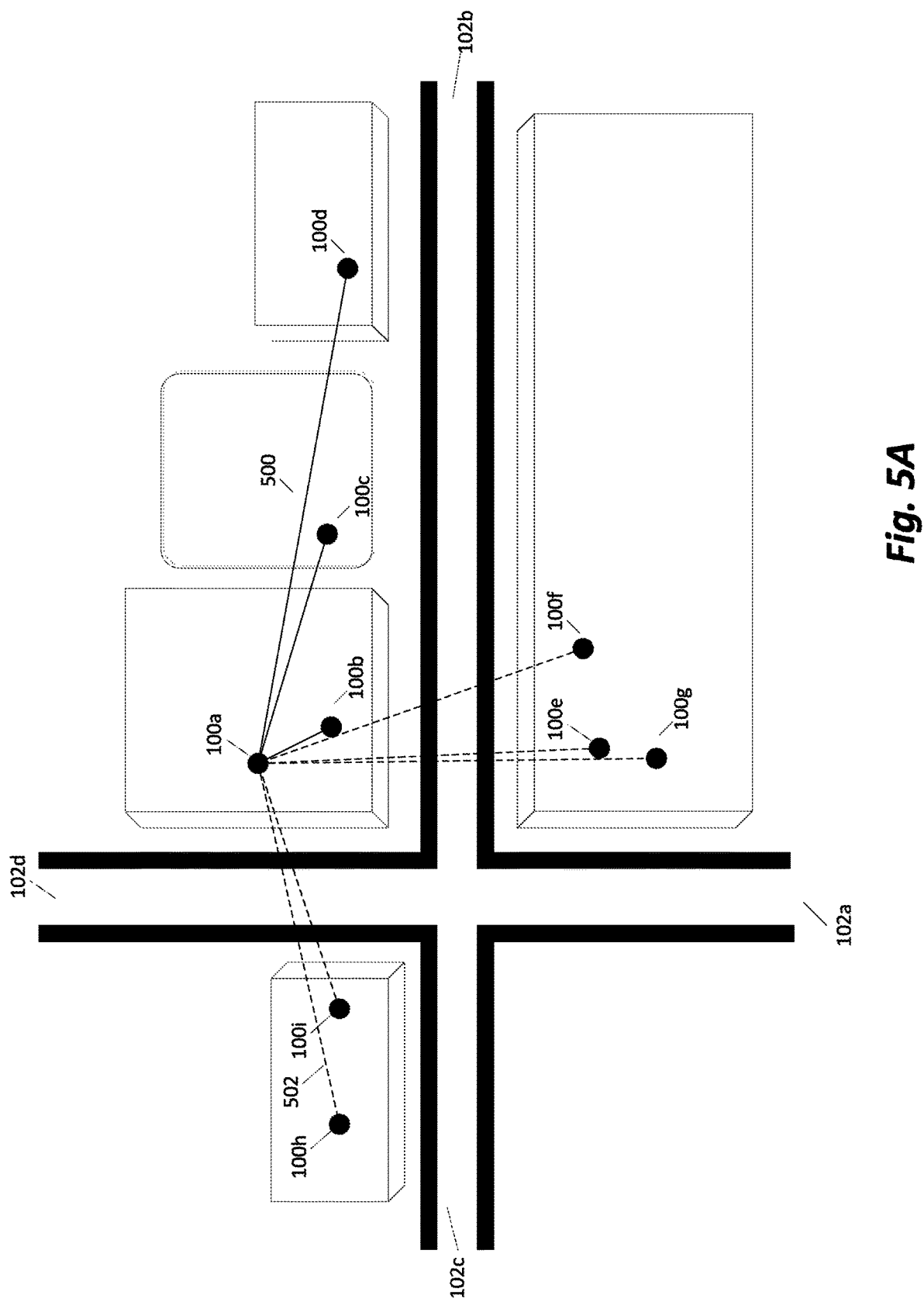

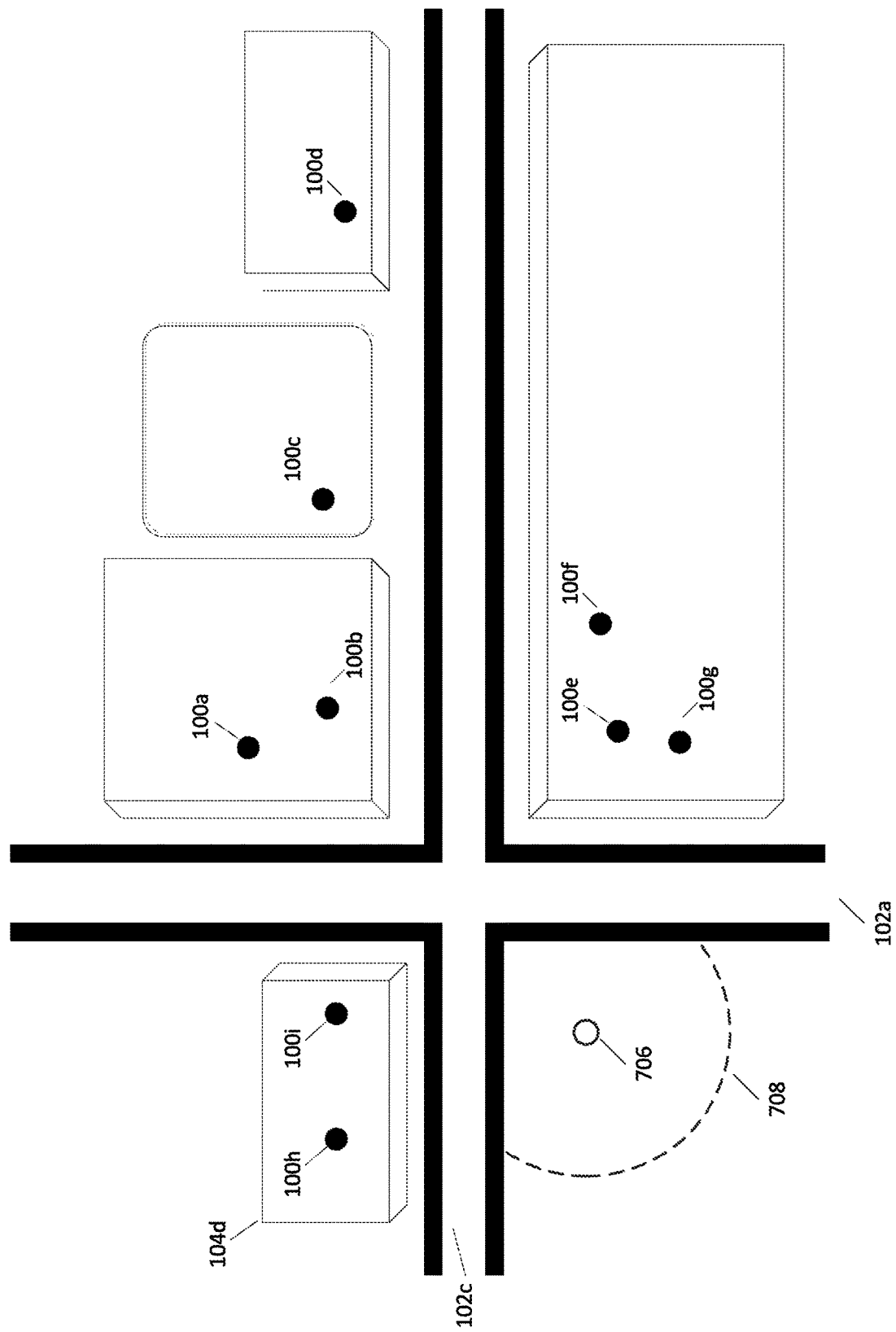

VEHICLE ROUTING GUIDANCE TO AN AUTHORITATIVE LOCATION FOR A POINT OF INTEREST

CROSS REFERENCE TO RELATED APPLICATIONS

This application is a continuation of co-pending U.S. application Ser. No. 15/606,555, filed May 26, 2017, which is herein incorporated in its entirety by reference.

BACKGROUND

Field

The described embodiments relate generally to providing vehicle routing guidance to points of interest, and more particularly to selecting a particular location for a point of interest (POI) given multiple candidate locations.

Description of Related Art

Locations of objects (known often as points of interest, or POIs) on a digital map are typically specified using a coordinate system such as latitude and longitude. A data provider might report, for example, that a particular gas station is located at a specific latitude and longitude. Alternatively, the data provider might simply provide a street address for the POI, leaving it to a map generator to convert, or "geocode," the address into a coordinate system to place on the map.

In many real-world situations, there are multiple distributors of map data, and each may provide incomplete or different location information for a particular POI. This then requires the map renderer or other consumer of this location data to make a choice about which set of location data to give credence to. One way this is typically done is by identifying and removing outliers in the data—that is, discarding candidates who are more than some threshold distance away from the remaining candidates.

SUMMARY

Described embodiments enable selection of an authoritative candidate for determining a location of a point of interest. Source data including name, address, and location for POIs is received from multiple data sources. The received data is normalized for ease of comparison, and if more than two candidate locations for a POI exist, coordinates for each candidate are compared to coordinates of other candidates using a metric-based scoring system and a machine learning model, which together constitute an overall POI location selection system.

The metric-based scoring system utilizes a number of metrics or criteria that are applied to each candidate location to assess the accuracy of that data point. Metrics may be binary, categorical, or continuous values. Metrics may include, but are not limited to, across-the-road consensus (XTR consensus), building footprint consensus (BF consensus), the distance of a candidate location from the nearest road segment (DFR), nearest same segment consensus (NSS), and nearest segment popularity (NSP). Consensus metrics are binary or categorical metrics that determine whether the candidate location is included in a consensus group of locations. Candidate locations that qualify as consensus locations (for the XTR, BF, and NSS consensus metrics) are a member of a plurality or majority of candidate locations that satisfy a particular geographic constraint. For example, candidate locations that satisfy the XTR consensus metric are those that are part of a majority of candidate locations on a same side of a road segment, BF consensus locations are those that are part of a majority or plurality of candidate locations located inside of the same building footprint, etc.

Each candidate location is scored based on each of the metrics included in the scoring system. The particular score assigned to each metric value may be adjustable such that the data consumer can determine the relative importance of each metric to the authority or accuracy of a candidate point. Thus, the metric-based scoring system provides a flexible and understandable system for determining authoritative candidate locations.

The group of candidate locations for a particular POI may also be evaluated by a machine learning model. The machine learning model operates by determining feature vectors for each candidate location. The feature vector for a particular candidate location includes per-location features and per-pair features. Features may be binary, categorical, or continuous. Per-location features are a category of features that are calculated based on the data for candidate location alone, and typically not in comparison to other candidate locations, though there may be exceptions. For example, per-location features may include, but are not limited to whether a candidate location is on a road segment (OTR), the distance of a candidate location from the nearest road segment (DFR), POI category (e.g. café, restaurant, museum, park, etc.), whether a candidate location inside a building footprint (IB), nearest segment popularity (NSP) etc.

Per-pair features are evaluated on each combination of candidate location pairs in a set of candidate locations. For example, if there are three POI data providers in a particular data set, each provider providing a candidate location for each POI, then there would be three possible pairs of candidate locations for each POI and the feature vector would include two sets of per-pair features for each candidate location. Per-pair features may include, but are not limited to, whether the pair is across a road segment from each other (XTR), the distance between the pair, whether the pair is located in the same building (SB), whether the pair has the nearest same segment (NSS), etc.

To train the machine learning model, feature vectors are calculated for sets of training data, where the real location of the POI is known (e.g. curated by the POI data consumer or another entity). A gradient boosted decision tree (GBDT) algorithm may then be used to determine a decision tree for the training data set. The resulting decision tree may be a multiclass classifier or a set of binary classifiers. The GBDT algorithm may include an objective function for scoring model iterations that includes a loss term and regularization term. Other supervised learning algorithms typically used for classification may also be used, such as random-forest algorithms. In embodiments, with a single multiclass classifier, a single GBDT is learned that classifies a set of candidate locations to determine which location, if any, of the candidate locations is authoritative. In embodiments including multiple binary classifiers, a GBDT may be learned for each provider in the data set and for the case where no provider provides an authoritative location. In this case, each GBDT solves a binary classification problem for whether each provider has provided an authoritative point. For example, if there are three POI data providers a GBDT will be trained for each data provider to determine whether a candidate location provided by that provider is an authoritative point. In addition, a GBDT will be trained for the case where no provider is an authoritative point for a total of four GBDTs.

After the machine learning model has been trained, any new POI data from the set of providers is evaluated using the machine learning model. Each GBDT classifies a corresponding candidate location as authoritative or non-authoritative, where the corresponding candidate location was provided by the provider corresponding to that GBDT. The GBDT for no provider may also be evaluated using a separate set of features. Alternatively, a single multiclass GBDT may be used to classify a candidate location as authoritative from the plurality of provided candidate locations. Each GBDT outputs a classification and a corresponding confidence value. An authoritative candidate location can then be chosen based on a set of confidence criteria, or if the confidence criteria is not satisfied by any of the GBDT classifications the machine learning model may determine that there is no authoritative candidate location from the set of provided locations.

Once the results of the machine learning model and the metric-based scoring model have been independently determined, they are compared to determine whether the same candidate location was selected by each model. If the model selections differ a set of selection criteria is used to determine candidate location is the most authoritative candidate, or whether no authoritative candidate can be determined.

Once the authoritative candidate is chosen it can be used to render digital maps that include the POI. In addition, the authoritative candidate's location can be used to provide vehicle route guidance to the POI.

Additional features of the various embodiments are described further below, and nothing in this summary is intended as limiting in scope, or as indicating that a particular feature is essential or otherwise required.

BRIEF DESCRIPTION OF THE DRAWINGS

FIG. 5A is a conceptual illustration of determining the XTR metric for an example of multiple potential candidate locations in accordance with one embodiment.

FIG. 7A-7B are conceptual illustrations of the application of authority criteria for an example of multiple potential candidate locations and differing example curated locations in accordance with one embodiment.

DETAILED DESCRIPTION

One use case we explore here for purposes of illustrating various embodiments involves a travel coordination system. Other use cases exist—in general, any application that benefits from having knowledge of a POI's location with respect to nearby road segments—and the particular examples that flow throughout this description should be understood to be given for ease of illustration, and not as a limitation of scope.

Considering this example use case then, assume a user of a transportation coordination system's client application, whom we shall refer to as a rider, wants to secure a ride from some first location, and to be dropped off at the Has Bean Coffee Shop in Las Vegas, Nev. While it may be possible that the rider knows the actual and precise latitude and longitude of the drop off point, it is more likely—and we assume, for purposes of this discussion—that the rider knows only the name and perhaps the general location of the coffee shop. Once the rider enters this information into the client software, or in a variation of the use case, tells the driver the information, the correct location of the Has Bean Coffee Shop in Las Vegas has to be determined so that the driver can be provided with accurate navigation directions to the correct drop off point.

A problem arises when there are multiple sources of data—such as multiple providers of name/location matching information—that give conflicting information about the precise location of a particular point of interest. There may be variation in the name of the point of interest, for example—"Has Bean Coffee Shop," "Has Bean Coffee," and "Has Bean Shop" might be names provided by three different data sources to refer to the same actual retail establishment. Similarly, the addresses provided by vendors may not match, and the latitude/longitude or other coordinates provided by the vendors may not match the actual coordinates of the street address, even if the street address is correct.

While this problem could potentially be avoided by better data curation on the part of vendors, we assume that the problem exists as it does today—that is, the data about POI locations supplied by different vendors is often inconsistent, and frequently wrong. Given that inconsistency, a number of different possible locations for the POI may exist, and one has to be chosen as authoritative before navigation routing can be performed. The question then is how to choose an authoritative candidate from among these different candidate locations for a particular POI.

Figure 1:
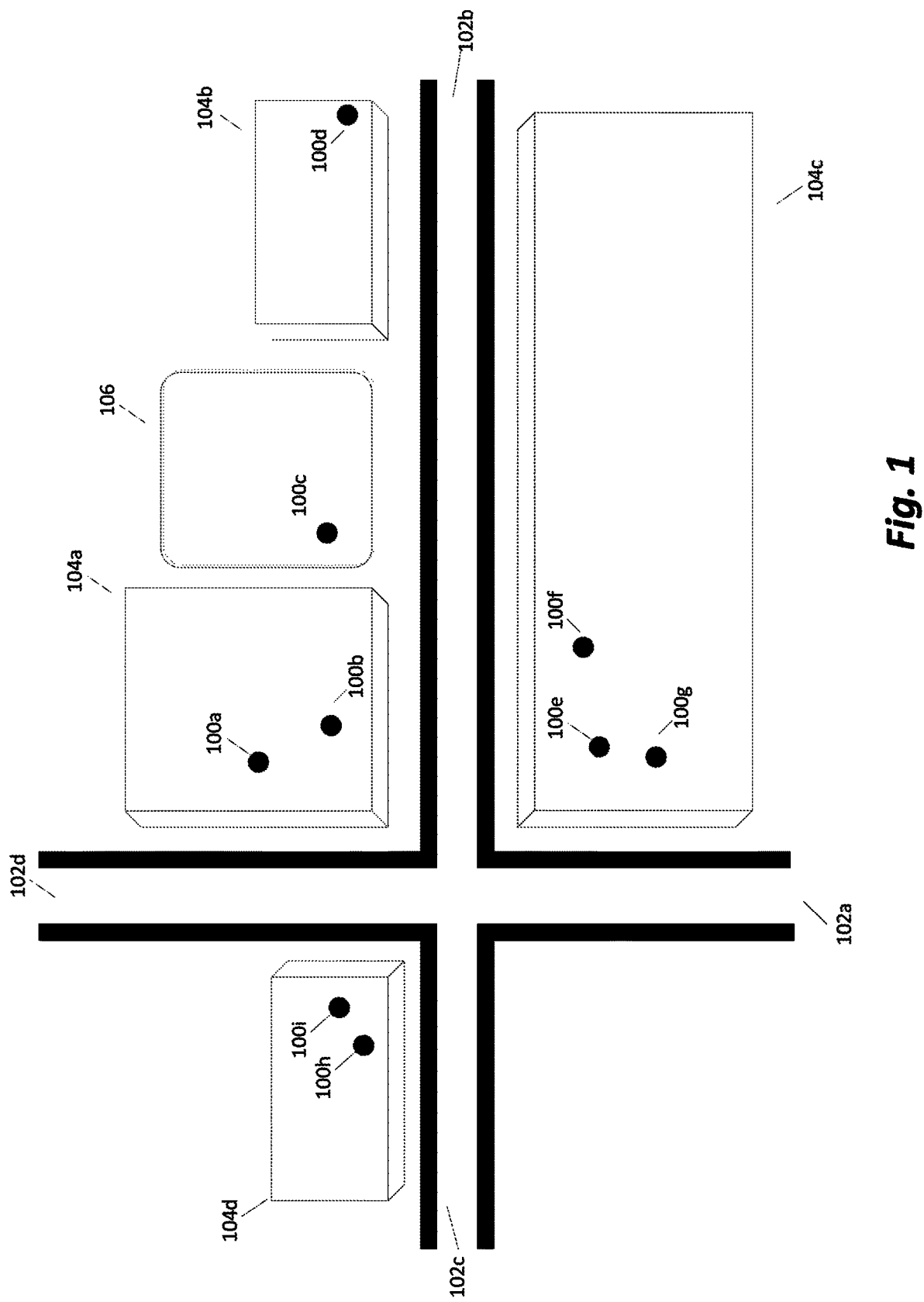
FIG. 1 illustrates an example of multiple potential candidate locations for a point of interest according to one embodiment.

As noted above, one solution to this problem has been to identify candidate points that are outliers—that is, they are too far from the other candidate points to be considered potentially correct. For example, FIG. 1 illustrates four street blocks defined by the intersection of two streets. In this case, the intersection includes four street segments intersecting 102a, 102b, 102c, and 102d. Although the intersection only involves two streets, street segments more specifically define a section of street between two particular intersections. FIG. 1 also illustrates nine potential candidate locations for the relevant POI 100a, 100b, 100c, 100d, 100e, 100f, 100g, 100h, and 100i. In this example, these may be potential locations of the Has Bean Coffee Shop.

As can be seen in FIG. 1, candidate point 100d is a distance outlier, located relatively far from the remaining candidate points 100a-100c and 100e-100i. Using methods that simply neglect distance outliers, candidate point 100d would be dropped from consideration when choosing the ultimate authoritative location, and one of the remaining eight candidates would be chosen instead.

Unlike the methods just described, embodiments described herein take into account a variety of mapping features and metrics in a two part system for POI location selection. For example, candidate point 100i is much closer to the average candidate location and could easily survive a distance outlier test unscathed. But, from a travel coordination system user's perspective, being dropped off at point 100i would represent significantly more inconvenience than being dropped off at point 100b, assuming that the actual position of the POI was one of 100a-100c—in the case of a drop off at point 100i, the rider would be forced to cross the intersection, which could be time-consuming at least, and dangerous at worst. Furthermore, a navigation algorithm used to guide the driver to the drop off point would consume unnecessary time in routing the driver and rider to a point on the wrong side of the intersection, which might add cost as well as inconvenience to both parties.

FIG. 1 for illustration purposes shows nine candidate positions for a single POI. In an actual POI location selection system, there may a larger or smaller number of candidate locations. In addition to the candidate positions 100a-100i, FIG. 1 also illustrates a number of map features, from a map data provider including street segments 102a-102d, building footprints 104a-140d and parking lot 106. In addition to the illustrated features the map data may also include additional types of features. Furthermore, the map features and candidate positions for a POI are illustrated in a two dimensional fashion for ease of illustration only. Map data may be provided in a three dimensional format depending on the embodiment.

Figure 2:
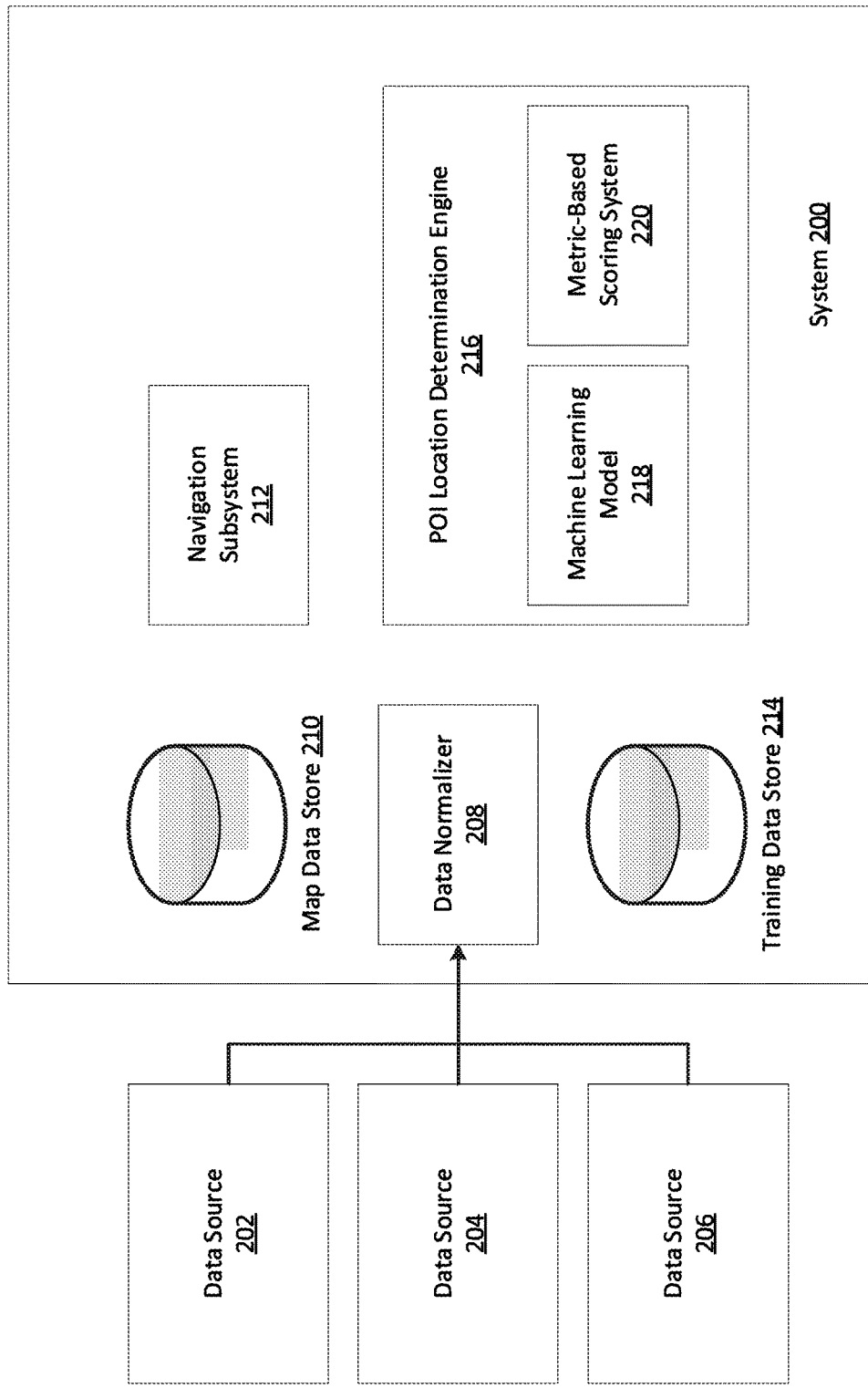
FIG. 2 illustrates a system for determining an authoritative location of a point of interest in accordance with one embodiment.

FIG. 2 illustrates a system 200 in accordance with one embodiment for determining an authoritative location of a POI. Multiple sources 202, 204, 206 of POI data provide their data to a data normalizer 208 of system 200. Although only three data sources are shown for illustrative ease, any number of source providers can be used. In some embodiments, individual users can be data providers in a crowd-sourcing system. Alternatively, or in addition to crowd-sourced data, curated data can be provided by multiple vendors, for example as part of a commercial relationship. Typically, this data includes at least a name, address and coordinates of the POI, and may additionally include other information, e.g., opening times, pricing, and the like. Data from these providers can be accessed programmatically, for example via web-based interfaces.

Data normalizer 208 receives the POI data from the data sources 202, 204, 206 and normalizes it. For example, data may be reported by the data sources in different formats having different file types, naming conventions, address specifications, coordinate systems, and the like. Normalization allows data from the various sources to be compared against each other for purposes of identifying which candidate should be considered authoritative. In one embodiment, Apache Thrift's map. feature interface can be used to assist with data normalization. Additionally, the data normalizer 208 may apply secondary features for a particular POI. For example, data providers 202, 204, and 206 may provide labels for a particular POI indicating that a POI is a café, restaurant, and historical site respectively. The data normalizer 208 might then apply a set of rules to determine a single label for the POI based of the provided labels. Alternatively, the POI may be categorized by all provided labels.

Map data source 210 includes base map data and road network data. Base map data includes feature information that is typically used to render a digital map, and the particular features included in the data source 210 can vary in different embodiments depending on the desire of the implementer and the purpose for which the map is being used. Data source 210 includes road network data, which describes networks of road segments and navigation rules for the segments, which allows a navigation subsystem 212 to provide routing guidance from a first location to a second location. Additionally, map data source may include other geographic features or landmarks that would not be provided by POI providers. These may include but are not limited to, building footprints, parking lot footprints, street width data, building height data, and other geographic information.

Navigation subsystem 212 provides routing guidance from a first location to a second location. In one embodiment, and as contemplated in the use case example described here, navigation subsystem 212 is part of a travel coordination system that connects riders with drivers so that drivers can provide riders with trips from a first location to a second location (in this case, a POI). In other embodiments, navigation subsystem 212 is not part of a travel coordination system, and instead provides navigation data to the POI for any driver on request, or as part of a service offered by an implementer of system 200 directly to drivers or to intermediaries who in turn provide such a service to drivers. Note also that while we refer to "drivers" throughout this description, the described embodiments have equal application to providing routing information to pedestrians, cyclists, or any other potential user.

The training data store 214 is a data repository storing data for use in training the machine learning model 218. The training data store 214 may contain curated data for a number of POIs including at least the name, address, and specific location coordinates of a POI. The curated coordinate for a given POI may be an exact location of the POI or a beneficially located drop-off location close to the POI, depending on the use case of the POI selection system. For example, in pick-up and drop-off use cases it may be beneficial to use an ideal drop-off location as the curated data point. The training data stored in the training data store 214 may be curated by the entity implementing the POI selection or received from a trusted third party source. The training data store 214 may be configured to store tens of thousands of curated POI locations or more depending on the embodiment.

POI location determination 3631 216 uses the normalized POI data received from the various data sources, in combination with the base map data and road network information from map data source 210 to select an authoritative candidate to use when providing navigation routing to a driver and for rendering on a map, for example on a driver's device or rider's device. The POI location determination engine 216 includes a machine learning model 218 and a metric-based scoring system 220 that are used together to select an authoritative candidate position for a POI.

In some embodiments, the machine learning model 218 is a gradient boosted decision tree (GBDT) model, and is trained utilizing an algorithm such as XGboost. Other embodiments may utilize other classification models such as a random forest classifier and/or may utilize training algorithms other than XGboost. Typically training algorithms include a loss function and a regularization function. One of skill in the art will appreciate that many supervised learning algorithms could be used to classify the training data. The training and operation of the machine learning model 218 are detailed in FIGS. 6 and 8 respectively.

Referring to the example of the travel coordination system, in which a rider would like a driver to take her to the Has Bean Coffee Shop in Las Vegas, in one embodiment, a rider uses a client application on a mobile device, such as mobile device 1000 described below with respect to FIG. 10. Using device 1000, the rider inputs a POI identifier, which in this case is "Has Bean Coffee Shop." The request is received by navigation subsystem 212 for coordinating travel between the rider and a driver.

In one embodiment, the selection by system 200 of an authoritative POI may be done at the time a request is received by system 200 from a rider for a POI. In other embodiments, identification of an authoritative POI candidate is done prior to the point at which a request is received from a rider. For example, system 200 may process and determine authoritative candidates each time data is received from a data source 202, or may perform the processing in batch, either periodically, or once a particular number of candidates have been received. Alternatively, system 200 may determine authoritative candidates when additional training data has been curated and stored in the training data store 214. The particular timing for determination of the authoritative candidate is left to the discretion of the implementer, and for purposes of description in FIG. 3, we presume that the determination is made prior to receiving the request from the rider.

Figure 3:
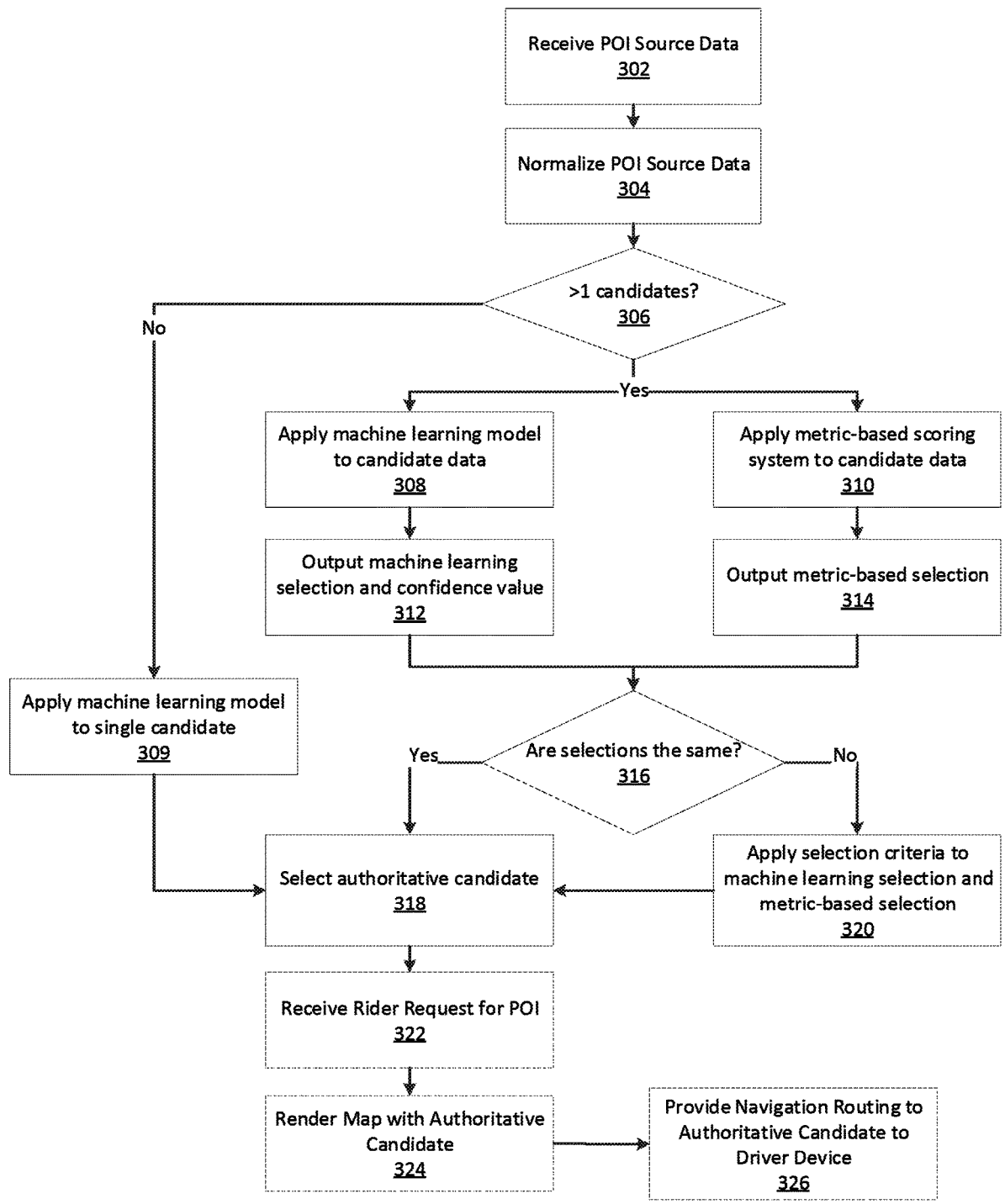
FIG. 3 illustrates a method for determining an authoritative location of a point of interest in accordance with one embodiment.

In FIG. 3, the illustrated method begins with the receipt 302 of data from the various data sources. As described above, different data providers may provide data in different formats with variation in names, address, or coordinates, and system 200 thus normalizes 304 the data to make comparison feasible.

In some embodiments, if 306, for a particular POI, there is only one candidate location, then no further analysis need be done, as the sole candidate is the authoritative candidate 309. However, in some embodiments, the machine learning model 216 may still be applied to the single candidate to determine the certainty that the particular candidate is close enough to the actual POI location when compared to the possibility that the no candidate location is accurate.

Alternatively, if 306 there is more than one candidate for the POI's location, POI location determination engine 216 applies 308 the machine learning model 218 to the normalized POI location candidates. Simultaneously, or in series, the POI location determination engine 216 also applies 310 the metric-based scoring system 220. The machine learning model 218 then outputs 312 a selection of an authoritative candidate location from the plurality of candidate locations for the POI and an accompanying confidence score for the selection. The metric-based scoring system 314 also outputs a second selection of an authoritative candidate from the plurality of candidate locations and, optionally, a second confidence score associated with the second selection.

The POI location selection engine 216 then compares 316 the two selections from the machine learning model 218 and the metric-based scoring system 220 and determines whether both processes have resulted in the same selection of an authoritative candidate. If 318, the selected candidates are the same then that candidate is selected as the overall authoritative candidate. If 320, selected candidates are different then the POI location selection engine 216 applies a set of selection criteria to determine which of the two selection should be selected as the final authoritative candidate.

Selection criteria are a set of criteria used by the system 200 to determine, which of the machine learning selection and the metric-based selection should be selected as the final authoritative candidate for a POI. In some embodiments, both selections are associated with a confidence value and so the selection criteria may simply be choosing the selection with the highest confidence. Alternatively, if only the machine learning selection has an associated confidence level, the selection criteria may instead be implemented as a confidence threshold for the machine learning selection. If the confidence for the machine learning selection is greater than the threshold, the machine learning selection will be selected as the authoritative candidate. If the confidence is lower than the threshold, then the metric-based selection may be selected as the authoritative candidate. In another embodiment, different confidence thresholds may be applied to each selection and if neither confidence value meets the threshold the selection process may be determined to be inconclusive.

In some embodiments, additional variations of either the machine learning model 218 or the metric-based scoring system 220 may be utilized by the POI location determination engine 216. In these cases, more complex comparisons 316 and selection criteria may be utilized to select an authoritative candidate from amongst multiple model outputs.

After an authoritative candidate location is selected 320, a series of optional steps may be completed if the system 200 is a travel coordination system. As noted, we have assumed for purposes of this discussion that the authoritative candidate is selected prior to receiving the rider's request for coordination of transportation to the POI. Thus, following selection 318 of the authoritative candidate, the rider's request is received 322. In one embodiment, the mobile device 1000, executing a software application for rider-side coordination of travel requests, can display a map of the location surrounding the POI, with the authoritative candidate rendered 324 on the map. In one embodiment, system 200 then uses the navigation subsystem 212 to coordinate a ride between the rider and a driver, and in one embodiment provides 326 navigation routing to the authoritative POI location, for example by providing routing information to a driver's device.

Figure 4:
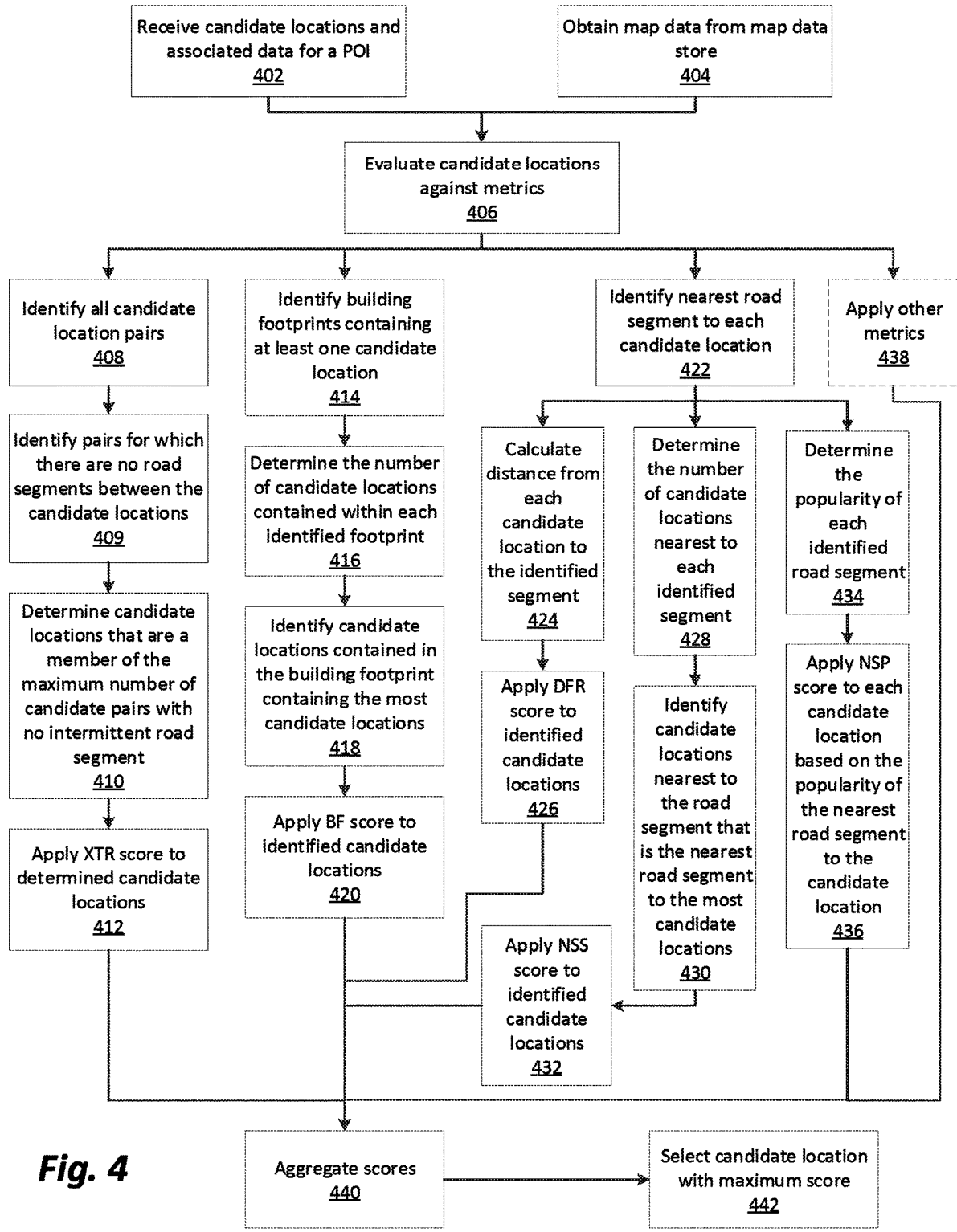
FIG. 4 illustrates a method for determining an authoritative location of a point of interest using a metric-based scoring system in accordance with one embodiment.

FIG. 4 illustrates a method for determining an authoritative location of a point of interest using a metric-based scoring system in accordance with one embodiment. FIG. 4 details steps 310 and 314 of FIG. 3. First the metric-based scoring system 220 receives 402 candidate locations and associated data for a particular POI. The candidate locations are geo-coordinates specifying a proposed location for the POI and may also include address information. The associated data may include but are not limited to a POI type (e.g. café, restaurant, historical site, recreational area, park, museum, etc.), sublocation information (e.g. metadata indicating that the POI is inside of a mall, park, museum or other larger entity), or any other detailing information that might be provided by a POI data provider.

The metric-based scoring system 220 also obtains 404 map data from map data store 210 and proceeds to evaluate 406 the received candidate locations against a predetermined set of metrics. Depending on the particular metric, or the embodiment, a metric may be evaluated on a binary, categorical, or continuous scale such that particular candidate location for a POI receives a score for each metric it is evaluated against. Depending on the embodiment, any number of metrics may be used including but not limited to one or more of the following options.

Across-the-road (XTR) Consensus: Across the road consensus may be a binary or a categorical metric, depending on the embodiment, that identifies whether a given candidate location is a member of a consensus of locations in relation to which side of a road a location is located on. For example, if there are a total of four candidate locations and three of them are on one side of a road segment then each of those three candidate locations would satisfy the XTR metric and receive a corresponding score. The aforementioned result would occur because the three points on the same side of the road comprise the majority of points. Alternatively, only a plurality of points are required to satisfy the XTR metric. In another embodiment, different scores are assigned based on whether the candidate locations are a member of a majority consensus or a plurality consensus. In yet another embodiment, the score assigned is based on the size of the consensus when compared to the total number of candidate locations for a POI.

FIG. 5A is a conceptual illustration of how the metric-based scoring system 220 would evaluate the XTR metric for an example of multiple potential candidate locations in accordance with one embodiment. In FIG. 5A, the candidate locations 100a-100i are used again as an example. First, the metric-based scoring system 220 identifies 408 each pair of candidate locations. Then, each identified pair of candidate locations is evaluated against the map data to identify 409 whether there are any road segments between the two candidate locations.

To determine whether or not a road segment exists between two candidates, metric-based scoring system 220 uses map data from map data store 210. In one embodiment, map data is divided into multiple cells, and the cell(s) that include the coordinates of the candidates being compared are retrieved by system 220 from map data store 210. For example, GOOGLE's S2 library enables representation of latitude and longitude within regions of defined areas (cells). A cell can be loaded into memory and its contents (e.g., road segments and other features) easily identified. Other conventional technologies for representing coordinates on the Earth also exist, as will be appreciated by those of skill in the art, and can be sufficiently adapted for use as described here.

The metric-based scoring system 220 then determines 410 which candidate locations are a members of the most candidate pairs with no intermittent road segments. For example in FIG. 5A, to evaluate candidate location 100a, the metric-based scoring system 220 identifies that it is a member of eight pairs (indicated by the lines between 100a and each of the other candidate locations). It then identifies that, of the eight pairs of which 100a is a member, there are no intermittent road segments between the candidate locations in the pair for three of those eight pairs (indicated by solid 500 as opposed to dotted 502 lines). Therefore, in the example of FIG. 5A, candidate location 100a would be a member of a group of four candidate locations on the same side of the road. Because there are a total of nine candidate locations four candidate locations on the same side of the road would not constitute a majority consensus. However, the situation shown in FIG. 5A would constitute a plurality consensus. If candidate locations 100h and 100i were not included and instead candidate location 100a was on the same side of the road as four of the seven total candidate, then candidate location 100a would be a member of a majority consensus of candidate locations and would receive a corresponding score. The process of identifying pairs would be completed for each candidate location for a POI. One of skill in the art will recognize that other methods may be used to determine XTR consensus (e.g. by identifying city blocks and counting the number of candidate locations in each city block), and any of these methods may be used depending on the efficiency requirements and available map data for a particular implementation.

Once each candidate position has been evaluated, an XTR score is applied to each candidate location. The score may be binary by applying one score to points outside of the consensus and another to those that are a member of the consensus group. Alternatively, three different scores may be applied based on whether the candidate location is a member of a majority consensus, plurality consensus, or no consensus at all. Finally, an XTR score may be applied based on the number of candidate locations on a particular side of the road, the score may be directly proportional to this number or otherwise related.

Building Footprint (BF) Consensus: The BF consensus metric is similar to the XTR consensus metric, but instead of determining consensus for a particular side of a street, a consensus is determined within particular buildings. This metric may only be calculated for embodiments that have access to more detailed map data that includes building footprints. The BF consensus metric may also apply a score to candidate locations that are a member of a local consensus of candidate positions on a particular side of a road or plurality consensus as discussed in relation to the XTR consensus metric.

Figure 5B:
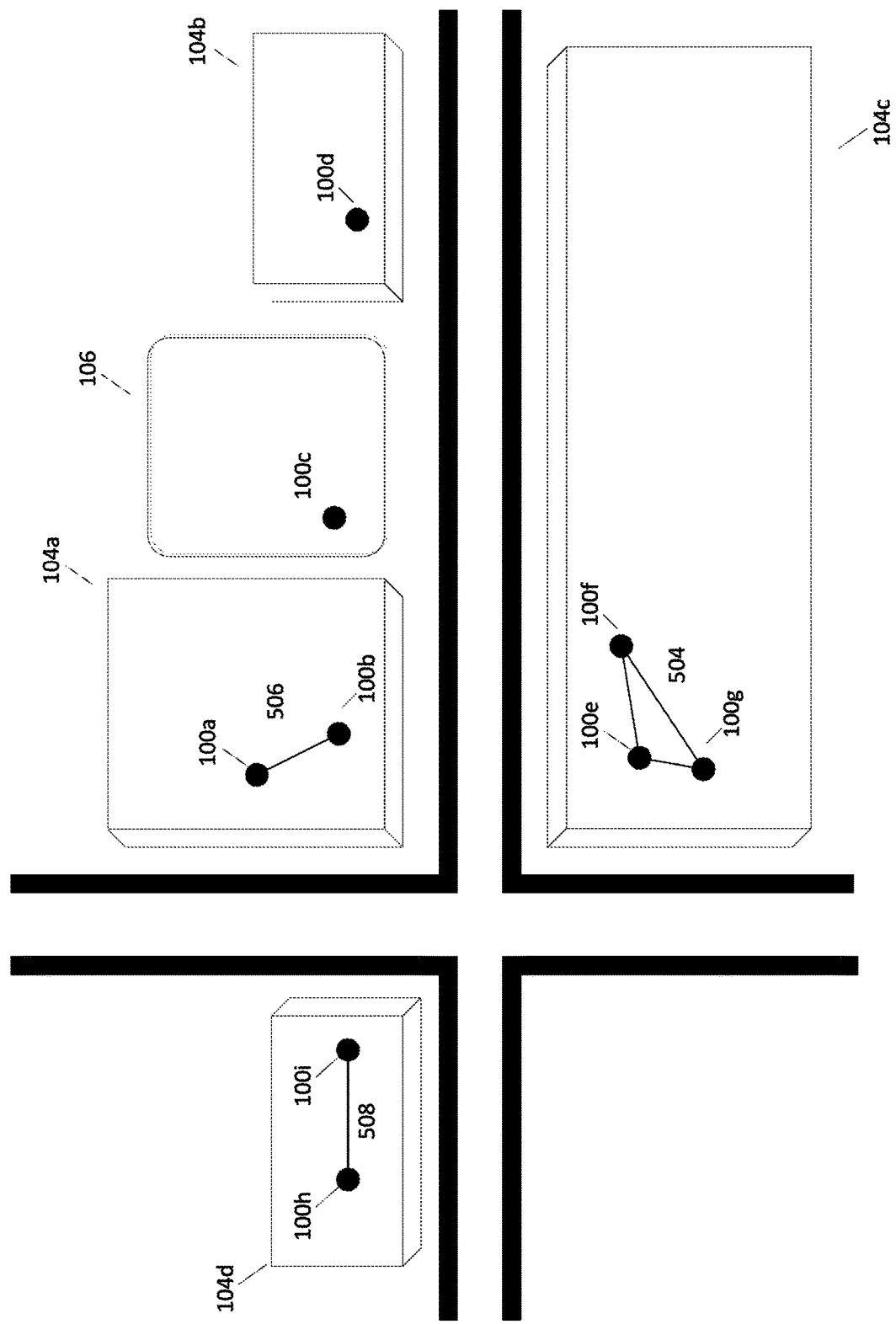
FIG. 5B is a conceptual illustration of determining the BF metric for an example of multiple potential candidate locations in accordance with one embodiment.

FIG. 5B is a conceptual illustration of determining the BF metric for an example of multiple potential candidate locations in accordance with one embodiment. In FIG. 5B the same example candidate positions 100a-100i are used. In this example, there are three groups of candidate locations forming a local BF consensus 504, 506, and 508. Each of these groups of candidate locations are located on a separate side of the road from the other candidate locations and, of the candidate locations on that side of the road, they are a member of a majority BF consensus. Meanwhile, candidate locations 100e-100g are members of a plurality BF consensus since three of the nine candidate locations are located in building 104c and a maximum of only two candidate locations are located in buildings 104a, 104b, and 104d.

To evaluate the BF consensus metric the metric-based scoring system 220 identifies 414 building footprints containing at least one candidate location and determines 416 the number of candidate locations within each identified footprint. The metric-based scoring system 220 then identifies 418 the candidate locations contained within the building footprint having the most candidate locations and applies 420 a BF score to the identified candidate locations.

However, depending on the embodiment, different scoring schemes can be used. For example, as described above the metric-based scoring system 220 may identify local consensuses and apply a separate score for members of those local consensuses, while applying a greater score to a plurality or majority consensus. Additionally, another score could be applied to any candidate locations that are inside of a building footprint but not part of any consensus, depending on the embodiment.

Figure 5C:
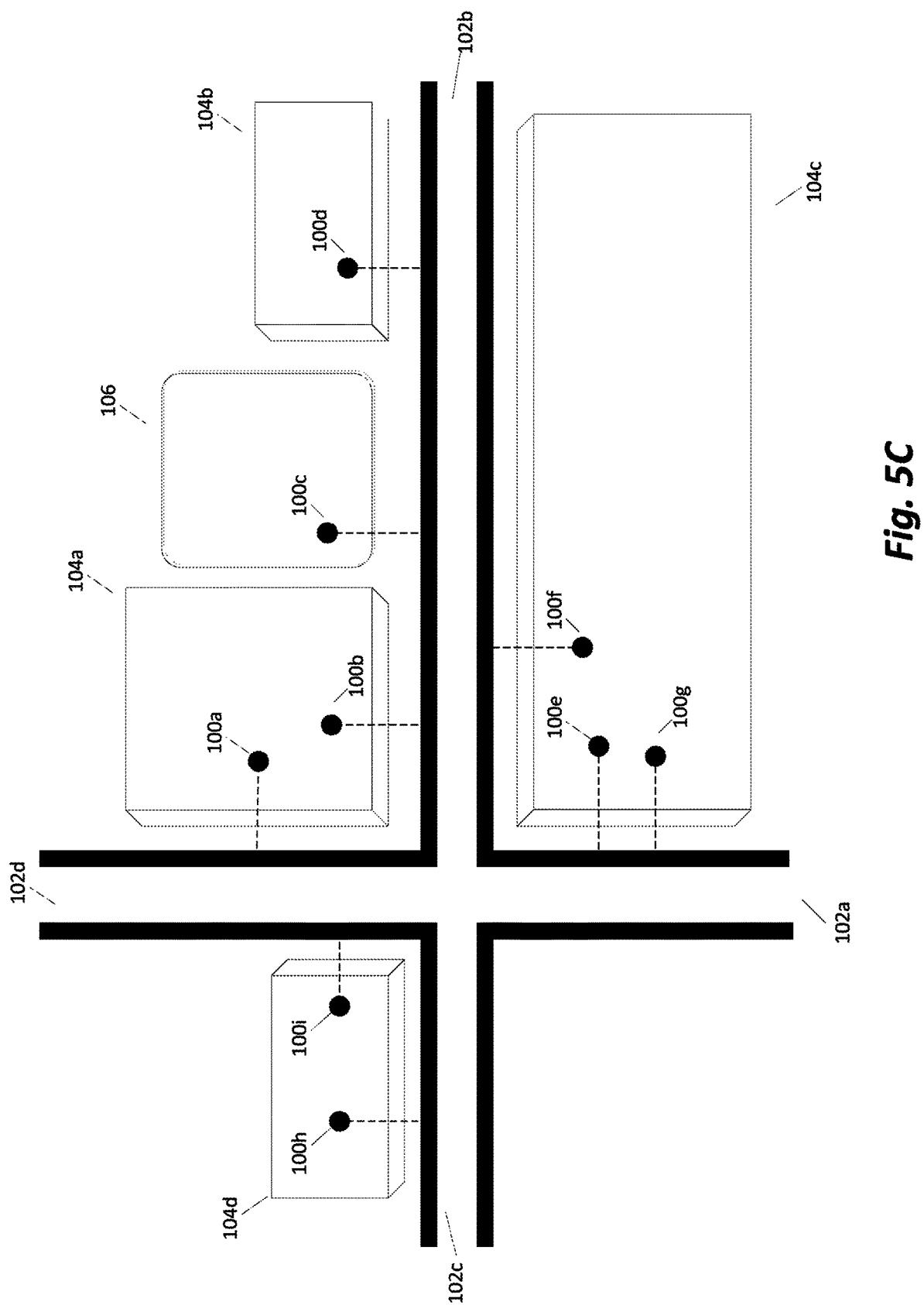
FIG. 5C is a conceptual illustration of determining the nearest road segment to calculate the DFR, NSS, and NSP metrics for an example of multiple potential candidate locations in accordance with one embodiment.

Distance-from-road (DFR): The DFR metric applies a score to a candidate location based on the distance between the candidate location and the nearest road segment 422. To calculate the DFR metric for each candidate location, the metric-based scoring system 220 calculates 424 the haversine distance between a candidate location and the nearest point of the closest road segment. The metric-based scoring system 220 then applies 426 a score for each candidate location based on the calculated distance. The score may be proportional to the distance or otherwise related. FIG. 5C is a conceptual illustration of determining the nearest road segment to calculate the DFR, NSS, and NSP metrics for an example of multiple potential candidate locations in accordance with one embodiment. The distance between each candidate location 100a-100i and road segments 102a-102d are represented by the dotted lines in FIG. 5C.

Nearest-same-segment (NSS) Consensus: NSS consensus is a metric that applies a score to a candidate location based on whether the candidate location is a member of consensus group of candidate locations that share the same nearest segment 428. The NSS consensus metric may apply scores in the same ways as the previously described consensus metrics regarding majority and plurality consensuses 430. In the example of FIG. 5C, two candidate locations, 100e and 100g, are nearest to road segment 102a, four candidate locations, 100b-100d and 100f, are nearest to road segment 102b, one candidate location 100h is nearest to road segment 102c, and two candidate locations, 100a and 100i, are nearest to road segment 102d. Thus, for the example in FIG. 5C candidate locations 100b-100d and 100f are members of a plurality consensus of candidate locations with the same nearest road segment. The metric-based scoring system 220 applies 432 a NSS score in either a binary, categorical, or proportional manner as previously described with reference to the other consensus metrics.

Nearest Segment Popularity (NSP): The NSP metric assigns a score based on the popularity of a nearest segment to each candidate location. The POI location determination engine 216 may determine 434 road segment popularity based on previously selected authoritative POI locations. Referring again to FIG. 5C, road segment 102a may, for example, be the nearest road segment to seven other previously located POI locations, segment 102b may be the nearest segment to fifteen other POI locations, segment 102c may be the nearest segment to nine other POI locations, and segment 102d may be the nearest segment to three POI locations. In this example, candidate locations 100e and 100g would be scored based on the popularity of segment 102a, candidate locations 100b-100d and 100f would be scored based on the popularity of segment 102b and so on. Alternatively, segment popularity might be obtained from the map data store 210 (i.e. from the map data provider).

The metric-based scoring system 220 would then apply 436 an NSP score to each of the candidate locations based on the determined nearest segment popularity. In some embodiments, the NSP score is applied based on the relative ranking of the segment popularity when compared to the other identified segments. Alternatively, the score is applied based on the absolute segment popularity when compared to all segments in map data store 210. The exact score applied depends on the implementation.

In addition the metrics discussed above, the metric-based scoring system 220 may apply 438 other metrics not specifically described. One of skill in the art can imagine metrics similar to the consensus metrics described above but instead based around other map features such as parking lots or smaller entities.

Once the candidate locations have been evaluated against all of the metrics, the scores applied for each metric are aggregated 440 by the metric-based scoring system 220. The aggregation of the scores may be simple sum of the individual scores for each candidate location.

Additionally, the score applied based on each metric may vary depending on the type, general location, or any other property of the POI. For example, BF consensus candidates may receive a greater score in suburban area than in an urban one, while XTR consensus candidates might receive a more highly weighted score in urban areas.

Once the scores for each candidate location have been determined by the metric-based scoring system 220 the candidate with the highest score is selected 442 as the authoritative candidate. In some embodiments, the metric-based scoring system calculates a confidence estimate based on the scores of the candidate locations and reports the calculated confidence value along with the selected candidate location to the POI location determination engine 216.

In some embodiments, the confidence score for an authoritative candidate selection is determined by applying the metric-based scoring system 220 to a data set of candidate locations for POIs where the true authoritative candidate is known (discussed in more detail with reference to FIGS. 7A and 7B). An accuracy score is then determined based on the comparison and used as an estimate for the confidence associated with the selections of the metric-based scoring system 220.

Figure 6:
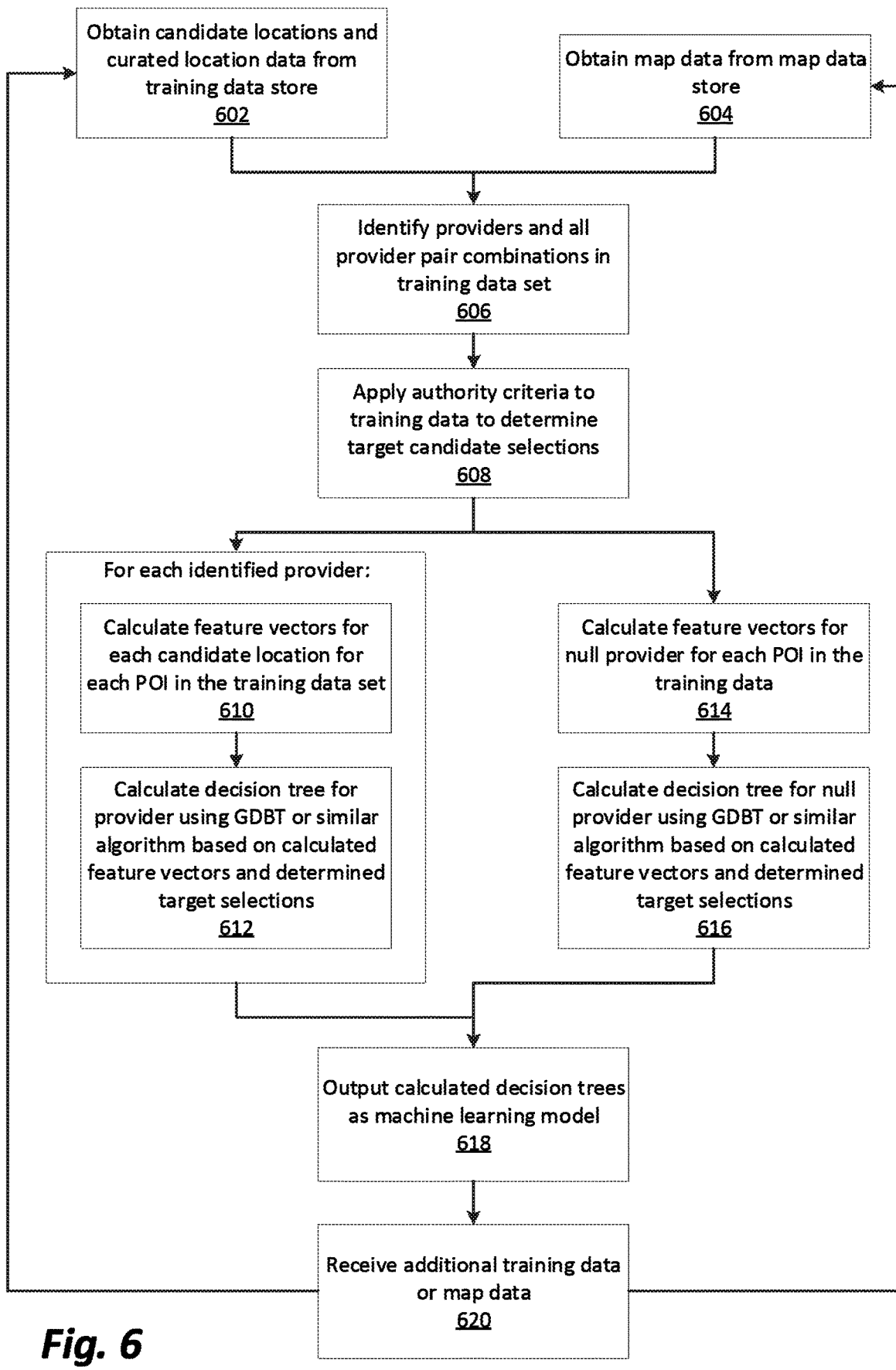
FIG. 6 illustrates a method for training a machine learning model for determining an authoritative location in accordance with one embodiment.

FIG. 6 illustrates a method for training a machine learning model for determining an authoritative location in accordance with one embodiment. Before the machine learning model 218 can be applied 308 the POI location determination engine 216 must train the machine learning model 218 using training data from training data store 214 and the method described in FIG. 6. Initially, the engine 216 obtains 602 candidate locations and associated curated location data from training data store 214 and obtains 604 map data from map data store 210. Thus, for each POI in the training data set, the engine 216 obtains a set of candidate locations from the data providers and a curated location. The curated location may be curated manually (e.g. by geotagging each POI) by the entity implementing system 200 and may be the exact location of the entrance of the POI or any other standardized location for the POI. The position of the curated location relative the whole area occupied by the POI may vary depending on the type of the POI. For example, for a park the curated location might be located in the center of the park while for a café the implementer of system 200 may choose the curated location to be the front entrance of the café. The curated location serves as the reference for determining the correct authoritative candidate location in the training data, such that a loss function operating on the data can evaluate the selection of the machine learning model 218.

Once engine 216 has accessed the appropriate data, engine 216 identifies 606 all of the providers and provider-pair combinations in the training data set. The engine 216 accomplishes this by determining the number and identity for each of the data providers providing candidate locations to system 200. The engine 216 then determines the number of two member combinations that are possible from the identified providers. This step must be completed in order to generate a feature vector for each candidate location received from a provider.

Engine 216 then applies 608 authority criteria for each POI in the training data set to determine the target candidate selection for the machine learning model. The authority criteria are a set of rules that allow engine 216 to determine which of the candidate locations for a POI is the authoritative location while having access to the actual curated location of the POI. FIG. 7A-7B are conceptual illustrations of the application of authority criteria for an example of multiple potential candidate locations and differing example curated locations in accordance with one embodiment.

Figure 7A:
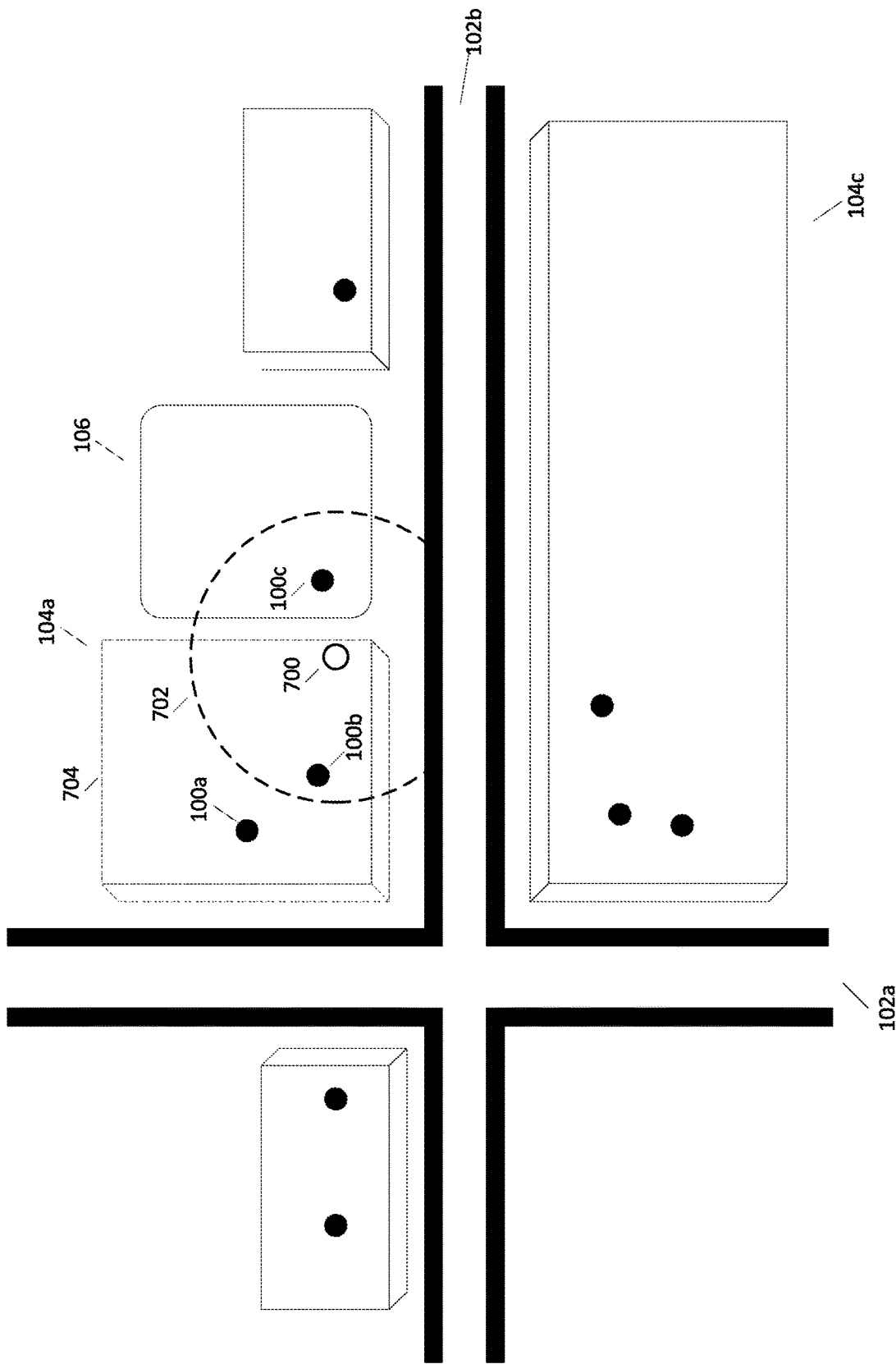

In FIGS. 7A and 7B candidate locations 100a-100i are used as an example yet again. Additionally, the curated location 700 is also illustrated. In some embodiments, the authority criteria specify an authority radius 702. Depending on the embodiment the authority radius may or may not extend across road segments. The authority criteria may specify that a target authoritative location must be within the authority radius 702 around the curated location 700. In some embodiments, the closest candidate location within the authority radius 702 is selected as the target location, which in this example would be candidate location 100c. Alternatively, or additionally, an authority criteria may be that the target criteria is required to be within the same building footprint 704 as the curated location 700. If the authority radius 702 and the building footprint criteria 704 are in effect then candidate location 100b would be selected as the target location because it lies within the authority radius 702 and within the building footprint 704. Other authority criteria may also be applied based on map features or the relative positions of the candidate locations and the curated location.

FIG. 7B illustrates an example where none of authority criteria are satisfied by the candidate locations 100a-100i. In this case, all candidate locations 100a-100i lie outside the authority radius 708 around the curated location 706. Because, according to the authority criteria, none of the candidate locations are a good approximation of the actual location of the POI, an appropriately trained machine learning model 218 may correctly classify a set of candidate locations as being inconclusive regarding an authoritative location by indicating a relatively high confidence in the "null provider." The selection of the provider for a POI indicates that the search for an authoritative location was inconclusive and likely to lead to an incorrect location so more detailed location information should be obtained.

Returning to FIG. 6, once the authoritative criteria have been applied to the training data set the target candidates will have been determined for each POI in the training data set. The subsequent step is then to calculate 610 per-location features for each provided candidate location for each POI in the training data set. A feature vector for a candidate location contains two types of features: per-location features and per-pair features. In an embodiment that utilizes binary classification on a per-provider basis, per-location features are included in feature vectors associated with the provider of the location to which the per-location feature applies. On the other hand, the same per-pair feature may be included in two feature vectors: a feature vector for each provider in the pair to which the per-pair feature applies. Thus, the same value of a per-pair feature would be present in two feature vectors, each vector associated with a different provider and used as training data for a different decision tree.

In an alternative embodiment, where a multiclass classification GBDT is used, all per-location and per-pair features are used in a single feature vector for a POI. In this case, the value of each per-pair feature is present only once per feature vector, where each vector is associated with a single set of candidate locations for a POI. The training data set is then used to calculate a multiclass decision tree that determines which provider provided the authoritative location for a POI.

Per-location features are a category of features that are calculated based on the data for a candidate location alone, and typically not in comparison to other candidate locations, though there may be exceptions. For example, per-location features may include, but are not limited to the following features:

On-the-road (OTR) Feature: The OTR features is a binary feature that indicates whether a candidate location is located on a road segment or off of a road segment.

Distance-from-road (DFR) Feature: The DFR feature is similar to the DFR metric discussed above in that it indicates the distance from a candidate location to the nearest road segment.

POI Category Feature: The POI category feature is a categorical feature indicating what type of POI the candidate location is labeled as (e.g. café, restaurant, museum, park, etc.). The POI category feature may be determined on a per-provider basis as each provider may use different POI category labels. Alternatively, the POI category feature may be evaluated after normalization and therefore may be consistent across candidate locations from different providers.

Inside-a-building (IB) Feature: The IB feature is a binary feature that indicates whether or not the candidate location is located inside of a building footprint.

Per-pair features are features that are calculated 612 on each combination of candidate location pairs in a set of candidate locations. For example, if there are four POI data providers in a particular data set, each provider providing a candidate location for each POI, then there would be six possible pairs of candidate locations for each POI and the feature vector would include three sets of per-pair features for each candidate location. Thus, each per-pair feature characterizes a particular aspect of a relationship between a pair of candidate locations. Per-pair features may include, but are not limited to the following:

Pair across-the-road (XTR) Feature: The pair XTR feature is a binary feature that indicates whether a pair of candidate locations are across a road segment from each other.

Pair Distance Feature: The pair distance features is a continuous feature indicating how far apart a pair of candidate locations are from each other.

Same-building (SB) Feature: The SB feature is a binary feature that indicates whether a pair of candidate locations are within the same building footprint.

Pair Nearest-same-segment (NSS) Feature: The pair NSS feature is a binary feature that indicates whether a pair of candidate locations has the same nearest road segment.

In the binary classification embodiment, a feature vector for a single candidate location therefore includes all of the per-location feature values for that candidate location and all per-pair feature values for pairs of candidate locations that include the candidate location. One of skill in the art will appreciate that additional or fewer features than those discussed above may be included in a feature vector depending on the embodiment.

In embodiments utilizing multiclass classification, a single feature vector is used and therefore each per-pair feature is only included once per-pair of data providers, as opposed to being included in the feature vector for each provider included in the pair.

Once feature vectors for each POI data set in the training data have been calculated 614, engine 216 may use a GBDT algorithm such as XGboost or another similar algorithm to calculate 616 a decision tree for each provider of POI data. The GBDT algorithm may include an objective function for scoring model iterations that includes a loss term and regularization term. Other supervised learning algorithms typically used for classification may also be used, such as random-forest algorithms. In some embodiments, a GBDT is learned for each provider in the data set and each calculated GBDT would solve a binary classification problem for whether each provider has provided an authoritative point. For example, if there are three POI data providers a GBDT will be trained for each of the three data providers to determine whether a candidate location provided by that provider is an authoritative point. In addition, a GBDT may be trained for the case where no provider is an authoritative point for a total of four GBDTs, as explained in more detail below. A candidate location would be incorrectly classified if it was classified as authoritative by a GBDT iteration when it was not the target location for a POI and would be classified correctly if it was the target location for the POI. For continuous features such as the DFR feature, regression or another statistical technique may be used to determine a value to for the GBDT to branch on.

In some binary classification embodiments, in addition to calculating a GBDT for each provider, a GBDT is also trained for the case that none of the providers have provided an authoritative candidate location. This process may be completed in the same way a GBDT is trained for each provider, by calculating feature vectors for the "null-provider" for each POI in the training data set, and by calculating a GBDT for the null provider. However, the feature vector for the null-provider option may differ from the provider feature vectors. Features for the null-provider option may pertain to the general map environment around the POI including but not limited to POI density in the general area, the POI type, and the type of the search area (e.g. urban, rural, suburban etc.). Additionally, summary statistics of the provider features may be used as null-provider features, depending on the embodiment.

In some alternative embodiments, a multiclass decision tree is calculated using a similar GBDT algorithm as discussed above, however instead of solving a binary classification problem for each provider, the GBDT solves a multiclass classification problem for the set of providers. In this case, only one feature vector is needed per POI data set. The resulting decision tree will directly indicate the authoritative provider and an associated confidence value as discussed in more detail below.

After the above described training steps have been completed, engine 216 outputs 618 the calculated GBDTs as the machine learning model 218. If system 200 receives 620 additional training data or map data, engine 216 may restart the training process. In some embodiments, the training method is run periodically or after a threshold number of additional training data points have been received.

Figure 8:
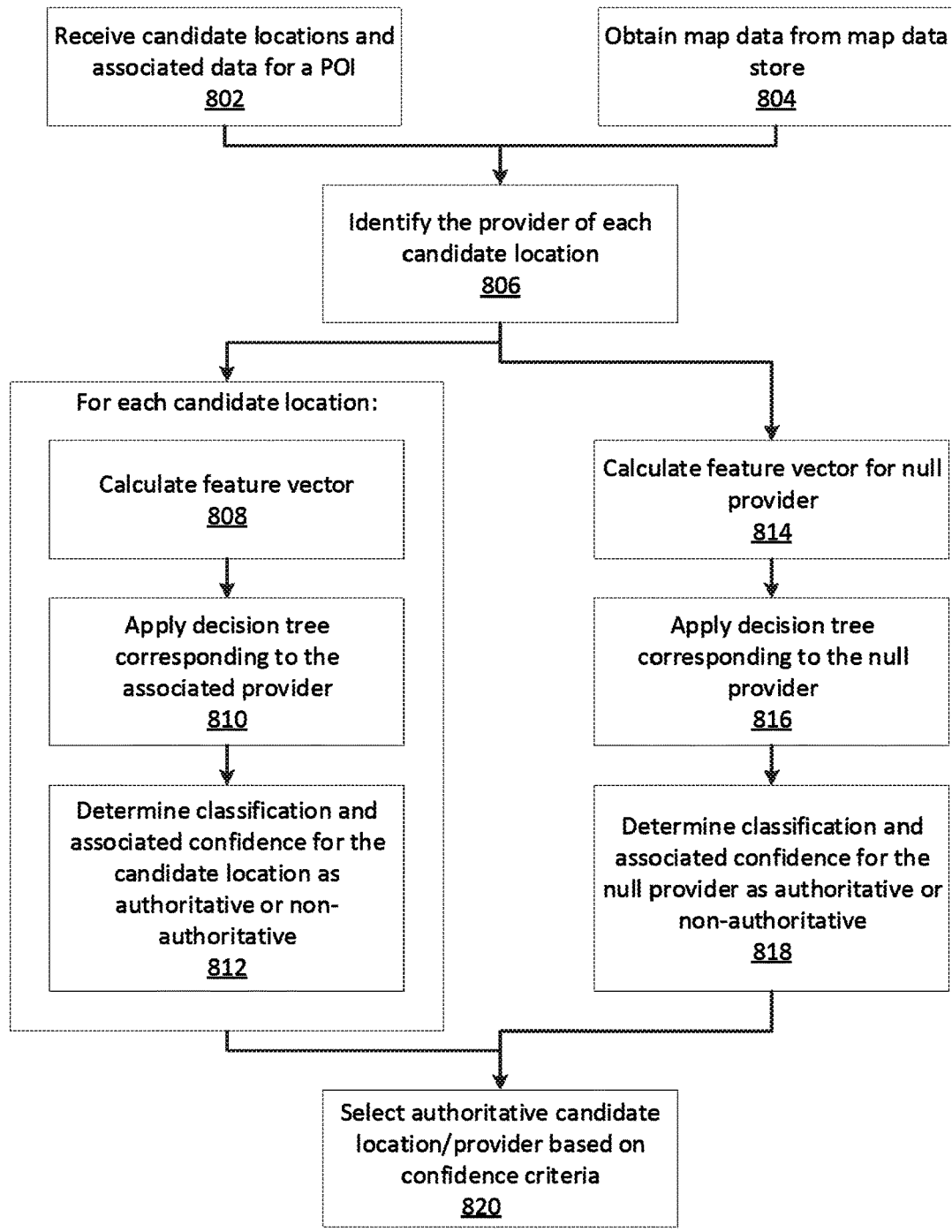
FIG. 8 illustrates a method for determining an authoritative location of a point of interest using a machine learning model in accordance with one embodiment.

FIG. 8 illustrates a method for determining an authoritative location of a point of interest using a machine learning model in accordance with one embodiment. The machine learning model 218 begins by receiving 802 candidate locations and associated data for a POI. The machine learning model may then obtain 804 map data from map data store 210. Once the data has been obtained, machine learning model 218 identifies 806 the provider for each received candidate position so that the appropriate feature vector can be calculated and the associated GBDT can be used to classify the candidate position as authoritative.

Once each candidate position has been matched to a provider, the machine learning model 218 may calculate 808 a single feature vector based on the candidate positions and associated information of the POI for embodiments that utilize a multiclass classification tree. Alternatively, in embodiments utilizing multiple binary classification trees, the machine learning model 218 may calculate 814 a feature vector for each identified provider or a candidate location.

In a multiclass classification embodiment, after calculating the single feature vector for the set of candidate locations for the POI, the machine learning model 218 applies 810 the multiclass decision tree to the calculated feature vector. The multiclass decision tree outputs a classification of the set of candidate locations thereby determining 812 an authoritative candidate location from the set.

In binary classification embodiments, the GBDT associated with the identified provider for the candidate position is applied 816 to the calculated feature vector associated with the same provider. As a result, the machine learning model 218 determines 818 the classification for whether each candidate location is authoritative or non-authoritative with an associated confidence value. In some embodiments, the confidence value may be calculated based on prevalence of the leaf of the GBDT corresponding to the feature vector of the candidate location.

In some embodiments that include a null-provider, the same process of calculating 814 a feature vector for each provider is used for the null-provider. In these embodiments, a binary decision tree is also applied to the feature vector associated with the null provider. The machine learning model 218 would then determine 818 a classification for whether or not any candidate locations are authoritative, thereby evaluating the null-provider hypothesis.

In a binary classification embodiments, once all classification and associated confidence values have been determined, the machine learning model 218 selects 820 an authoritative candidate location based on confidence criteria. The confidence criteria may specify a confidence value threshold for the candidate locations. If more than one candidate location satisfies the confidence threshold the candidate location with the greatest associate confidence value will be selected. Alternatively, if no candidate locations are classified as authoritative with sufficient confidence the null-provider may be selected instead. Alternatively, if the null-provider is classified as being the correct selection with high confidence, the confidence criteria may dictate that the null provider be selected over other confidence authoritative candidates.

Figure 9:
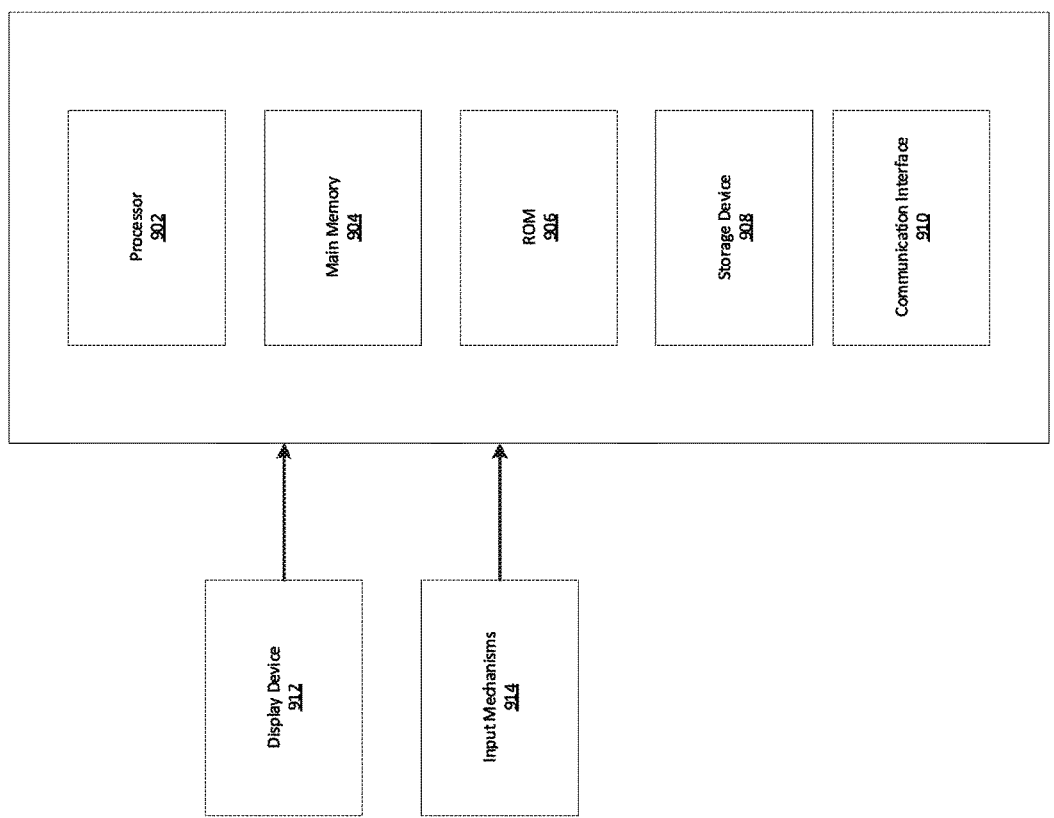
FIG. 9 is a diagram illustrating an example of a computer system upon which described embodiments may be implemented.

FIG. 9 is a diagram illustrating a computer system upon which embodiments described herein may be implemented. For example, in the context of FIG. 2, system 200 may be implemented using a computer system such as described by FIG. 9. System 200 may also be implemented using a combination of multiple computer systems as described by FIG. 9, with each computer system implementing one or more of the components of system 200. Multiple-computer-systems implementations include networked systems, such as a networked client-server system.

In one implementation, system 200 includes processing resources such as one or more processors 902, as well as main memory 904, read only memory (ROM) 906, a storage device 908, and a communication interface 910. System 200 includes the processor(s) 902 for processing information and main memory 904, such as a random access memory (RAM) or other dynamic storage device, for storing information and instructions to be executed by the processor(s) 902. Main memory 904 also may be used for storing temporary variables or other intermediate information during execution of instructions to be executed by processor(s) 902. System 200 may also include ROM 906 or other static storage device for storing static information and instructions for processor(s) 902.

The storage device 908, such as a magnetic disk or optical disk, is provided for storing information and instructions. The communication interface 910 can enable system 200 to communicate with one or more networks (e.g., cellular network) through use of the network link (wireless or wireline). Using the network link, system 200 can communicate with one or more computing devices, and one or more servers. In an example embodiment, the communication interface 910 is configured to communicate with one or more of the data sources 202, 204, 206 of FIG. 2.

In some variations, system 200 can be configured to receive sensor data (e.g., such as GPS data) from one or more location tracking devices via the network link. The sensor data can be processed by the processor 902 and can be stored in, for example, the storage device 908. The processor 902 can process the sensor data of a location tracking device in order to determine the path of travel of a transportation vehicle corresponding to the location tracking device. Extrapolated position information can be transmitted to one or more service requestor devices over the network to enable the service applications running on the service requestor devices to use the position information to present a visualization of the actual movement of the transportation vehicles.

System 200 can also include a display device 912, such as a cathode ray tube (CRT), an LCD monitor, or a television set, for example, for displaying graphics and information to a user. An input mechanism 914, such as a keyboard that includes alphanumeric keys and other keys, can be coupled to system 200 for communicating information and command selections to processor(s) 902. Other non-limiting, illustrative examples of input mechanisms 914 include a mouse, a trackball, touch-sensitive screen, or cursor direction keys for communicating direction information and command selections to processor(s) 902 and for controlling cursor movement on display device 912.

In an example embodiment, storage device 908 stores data normalizer 208, map data store 210, navigation subsystem 212, and the POI location determination engine 216 components of FIG. 2 as computer executable instructions. During operation, the processor(s) 902 executes the instructions and loads the components into main memory 904. The instructions cause the processor(s) 902 to perform the method of FIG. 3. In this way, the processor(s) 902 coupled to main memory 904, read only memory (ROM) 906, storage device 908, and communication interface 910 (as described below in greater detail) is a special-purpose processor.

Examples described herein are related to the use of system 200 for implementing the techniques described herein. According to one embodiment, those techniques are performed by system 200 in response to processor(s) 902 executing one or more sequences of one or more instructions contained in main memory 904. Such instructions may be read into main memory 904 from another machine-readable medium, such as storage device 908. Execution of the sequences of instructions contained in main memory 904 causes processor(s) 902 to perform the process steps described herein. In alternative implementations, hard-wired circuitry may be used in place of or in combination with software instructions to implement examples described herein. Thus, the examples described are not limited to any specific combination of hardware circuitry and software.

Figure 10:
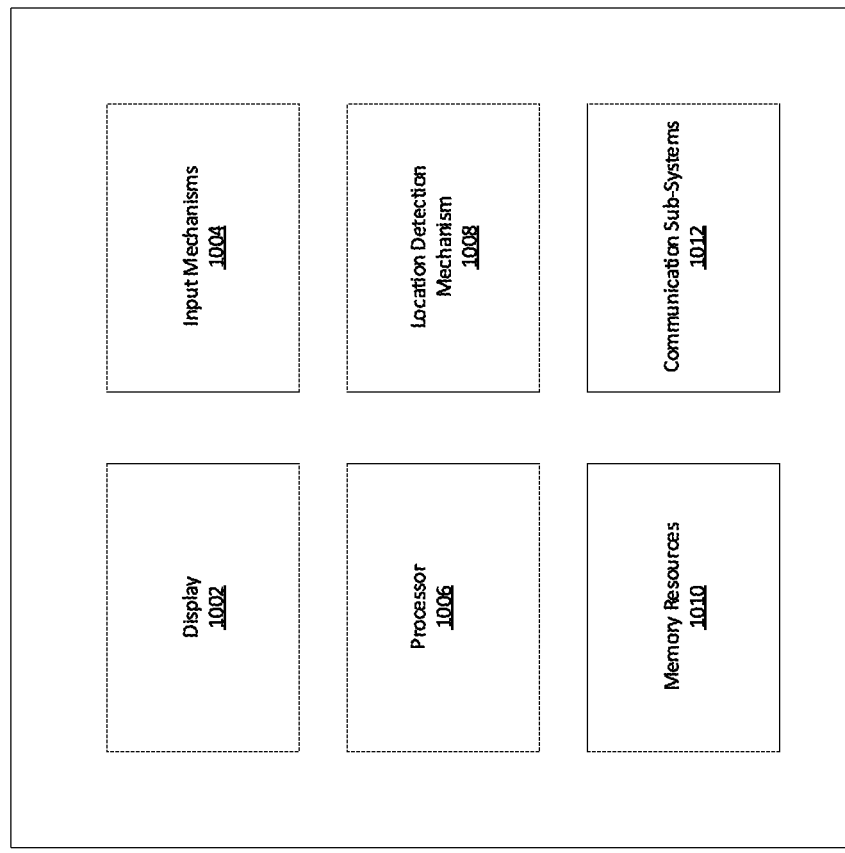
FIG. 10 is a diagram illustrating an example of a mobile computing device upon which embodiments described may be implemented.

FIG. 10 is a diagram illustrating a mobile computing device upon which embodiments described herein may be implemented as described above, for example with respect to a rider device or driver device. In one embodiment, a computing device 1000 may correspond to a mobile computing device, such as a cellular device that is capable of telephony, messaging, and data services. Examples of such devices include smartphones, handsets or tablet devices for cellular carriers. Computing device 1000 includes a processor 1006, memory resources 1010, a display device 1002 (e.g., such as a touch-sensitive display device), one or more communication sub-systems 1012 (including wireless communication sub-systems), input mechanisms 1004 (e.g., an input mechanism can include or be part of the touch-sensitive display device), and one or more location detection mechanisms (e.g., GPS module) 1008. In one example, at least one of the communication sub-systems 1012 sends and receives cellular data over data channels and voice channels.

The processor 1006 is configured with software and/or other logic to perform one or more processes, steps and other functions described with implementations, such as those described herein. Processor 1006 is configured, with instructions and data stored in the memory resources 1010, to operate a transportation system 100 as described herein. For example, instructions for operating the transportation system 100 to dynamically determine pick-up and drop-off locations can be stored in the memory resources 1010 of the computing device 1000.

The processor 1006 can provide content to the display 1002 by executing instructions and/or applications that are stored in the memory resources 1010. In some examples, one or more user interfaces can be provided by the processor 1006, such as a user interface for the service application, based at least in part on the received position information of the one or more transportation vehicles. While FIG. 10 is illustrated for a mobile computing device, one or more embodiments may be implemented on other types of devices, including full-functional computers, such as laptops and desktops (e.g., PC).

In addition to the embodiments specifically described above, those of skill in the art will appreciate that the invention may additionally be practiced in other embodiments.

Within this written description, the particular naming of the components, capitalization of terms, the attributes, data structures, or any other programming or structural aspect is not mandatory or significant unless otherwise noted, and the mechanisms that implement the described invention or its features may have different names, formats, or protocols. Further, the system may be implemented via a combination of hardware and software, as described, or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required. It should be noted that the process steps and instructions of the present invention could be embodied in software, firmware or hardware, and when embodied in software, could be downloaded to reside on and be operated from different platforms used by real time network operating systems.

Algorithmic descriptions and representations included in this description are understood to be implemented by computer programs. Furthermore, it has also proven convenient at times, to refer to these arrangements of operations as modules or code devices, without loss of generality.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented are not inherently related to any particular computer or other apparatus. Various general-purpose systems may also be used with programs in accordance with the teachings above, or it may prove convenient to construct more specialized apparatus to perform the required method steps. The required structure for a variety of these systems will appear from the description above. In addition, a variety of programming languages may be used to implement the teachings above.

Finally, it should be noted that the language used in the specification has been Bean principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for providing vehicle routing guidance to a point of interest, comprising:
   receiving, by at least one processor from a plurality of data sources, point of interest data including one or more candidate locations for the point of interest and identifying information for the point of interest;
   obtaining map data including at least locations of road segments in an area surrounding the one or more candidate locations for the point of interest;
   for each of the one or more candidate locations:
      evaluating for the candidate location, based on the map data and the candidate location, a plurality of metrics including at least one of a building footprint consensus metric, a distance from a nearest road metric, or a nearest segment popularity metric;
      determining a metric score corresponding to each of the plurality of metrics; and
      aggregating the metric scores to calculate an aggregate score for the candidate location;
   selecting a first candidate location from the one or more candidate locations, the first candidate location having a highest aggregate score of the one or more candidate locations; and
   providing vehicle routing guidance to the first candidate location.

2. The computer-implemented method of claim 1, further comprising:
   for the one or more candidate locations:
      calculating a feature vector for the one or more candidate locations, the feature vector corresponding to the point of interest;
      applying a multiclass classifier to the calculated feature vector;
      classifying one of the one or more candidate locations as authoritative using the applied classifier;
      calculating a confidence value associated with the classification of the candidate location; and
      selecting the classified candidate location as a second candidate location from the one or more candidate locations; and
   selecting an authoritative candidate location from the first selected candidate location and the second selected candidate location, based on the aggregate score of the first candidate location and the associated confidence value of the second candidate location.

3. The computer-implemented method of claim 2, wherein the multiclass classifier is a gradient boosted decision tree.

4. The computer-implemented method of claim 3, wherein the gradient boosted decision tree is trained by:
   retrieving training data containing a set of one or more candidate locations for each of a plurality of points of interest and a curated location for each of the plurality of points of interest, wherein each candidate location of each set of one or more candidate locations is associated with a different provider;
   obtaining map data including at least road segment data;
   for each of the plurality of points of interest in the training data:
      applying authority criteria to the set of one or more candidate locations associated with the point of interest;
      responsive to determining that a candidate location of the set of one or more candidate locations satisfies the authority criteria, based on the curated location, the set of one or more candidate locations associated with the point of interest, and the map data: selecting the candidate location as a target location for the point of interest; and
      responsive to determining that none of the set of one or more candidate locations satisfies the authority criteria, based on the curated location, the set of one or more candidate locations associated with the point of interest, and the map data: indicating that there is no target location for the point of interest; and
   applying a gradient boosting algorithm to train the gradient boosted decision tree that optimally classifies candidate locations in the set of one or more candidate locations as target locations or non-target locations for each point of interest in the training data, according to a loss function and a regularization function.

5. The computer-implemented method of claim 2, wherein the feature vector comprises a plurality of features including per-location features and per-pair features.

6. The computer-implemented method of claim 2, wherein the multiclass classifier includes multiple binary classifiers associated with each provider of candidate locations.

7. A computer program product for providing vehicle routing guidance to a point of interest, the computer program product stored on a non-transitory computer-readable medium and including instructions that when executed cause at least one processor to carry out steps comprising:
   receiving, by the at least one processor from a plurality of data sources, point of interest data including one or more candidate locations for the point of interest and identifying information for the point of interest;

obtaining map data including at least locations of road segments in an area surrounding the one or more candidate locations for the point of interest;

for each of the one or more candidate locations:

evaluating for the candidate location, based on the map data and the candidate location, a plurality of metrics including at least one of a building footprint consensus metric, a distance from a nearest road metric, or a nearest segment popularity metric;

determining a metric score corresponding to each of the plurality of metrics; and aggregating the metric scores to calculate an aggregate score for the candidate location;

selecting a first candidate location from the one or more candidate locations, the first candidate location having a highest aggregate score of the one or more candidate locations; and providing vehicle routing guidance to the first candidate location.

8. The computer program product of claim 7, wherein the steps further comprise:

for the one or more candidate locations:

calculating a feature vector for the one or more candidate locations, the feature vector corresponding to the point of interest;

applying a multiclass classifier to the calculated feature vector;

classifying one of the one or more candidate locations as authoritative using the applied classifier;

calculating a confidence value associated with the classification of the candidate location; and selecting the classified candidate location as a second candidate location from the one or more candidate locations; and selecting an authoritative candidate location from the first selected candidate location and the second selected candidate location, based on the aggregate score of the first candidate location and the associated confidence value of the second candidate location.

9. The computer program product of claim 8, wherein the multiclass classifier is a gradient boosted decision tree.

10. The computer program product of claim 9, wherein the gradient boosted decision tree is trained by:

retrieving training data containing a set of one or more candidate locations for each of a plurality of points of interest and a curated location for each of the plurality of points of interest, wherein each candidate location of each set of candidate locations is associated with a different provider;

obtaining map data including at least road segment data;

for each of the plurality of points of interest in the training data:

applying authority criteria to the set of one or more candidate locations associated with the point of interest;

responsive to determining that a candidate location of the set of one or more candidate locations satisfies the authority criteria, based on the curated location, the set of one or more candidate locations associated with the point of interest, and the map data: selecting the candidate location as a target location for the point of interest; and responsive to determining that none of the set of one or more candidate locations satisfies the authority criteria, based on the curated location, the set of one or more candidate locations associated with the point of interest, and the map data: indicating that there is no target location for the point of interest; and applying a gradient boosting algorithm to train the gradient boosted decision tree that optimally classifies candidate locations as target locations or non-target locations for each point of interest in the training data, according to a loss function and a regularization function.

11. The computer program product of claim 8, wherein the feature vector comprises a plurality of features including per-location features and per-pair features.

12. The computer program product of claim 8, wherein the multiclass classifier includes multiple binary classifiers associated with each provider of candidate locations.

13. A system for providing vehicle routing guidance to a point of interest, comprising:

at least one processor;

a point-of-interest location determination engine, executed by the at least one processor, configured to perform steps of:

receiving, by the at least one processor from a plurality of data sources, point of interest data including one or more candidate locations for the point of interest and identifying information for the point of interest;

obtaining map data including at least locations of road segments in an area surrounding the one or more candidate locations for the point of interest;

for each of the one or more candidate locations:

evaluating, for the candidate location, based on the map data and the candidate location, a plurality of metrics including at least one of a building footprint consensus metric, a distance from a nearest road metric, or a nearest segment popularity metric;

determining a metric score corresponding to each of the plurality of metrics; and aggregating the metric scores to calculate an aggregate score for the candidate location;

selecting a first candidate location from the one or more candidate locations, the first candidate location having the highest aggregate score of the one or more candidate locations; and providing vehicle routing guidance to the first candidate location.

14. The system of claim 13, wherein the steps further comprise:

for the one or more candidate locations:

calculating a feature vector for the one or more candidate locations, the feature vector corresponding to the point of interest;

applying a multiclass classifier to the calculated feature vector;

classifying one of the one or more candidate locations as authoritative using the applied classifier;

calculating a confidence value associated with the classification of the candidate location; and selecting the classified candidate location as a second candidate location from the one or more candidate locations; and selecting an authoritative candidate location from the first selected candidate location and the second selected candidate location, based on the aggregate score of the first candidate location and the associated confidence value of the second candidate location.

15. The system of claim 14, wherein the multiclass classifier is a gradient boosted decision tree.

16. The system of claim 15, wherein the gradient boosted decision tree is trained by:
- retrieving training data containing a set of one or more candidate locations for each of a plurality of points of interest and a curated location for each of the plurality of points of interest, wherein each candidate location of each set of one or more candidate locations is associated with a different provider;
- obtaining map data including at least road segment data;
- for each of the plurality of points of interest in the training data:
  - applying authority criteria to the set of one or more candidate locations associated with the point of interest;
  - responsive to determining that a candidate location of the set of one or more candidate locations satisfies the authority criteria, based on the curated location, the set of one or more candidate locations associated with the point of interest, and the map data: selecting the candidate location as a target location for the point of interest; and
  - responsive to determining that none of the set of one or more candidate locations satisfies the authority criteria, based on the curated location, the set of one or more candidate locations associated with the point of interest, and the map data: indicating that there is no target location for the point of interest; and
- applying a gradient boosting algorithm to train the gradient boosted decision tree that optimally classifies candidate locations as target locations or non-target locations for each point of interest in the training data, according to a loss function and a regularization function.

17. The system of claim 14, wherein the feature vector comprises a plurality of features including per-location features and per-pair features.

* * * * *